Patented Oct. 16, 1928.

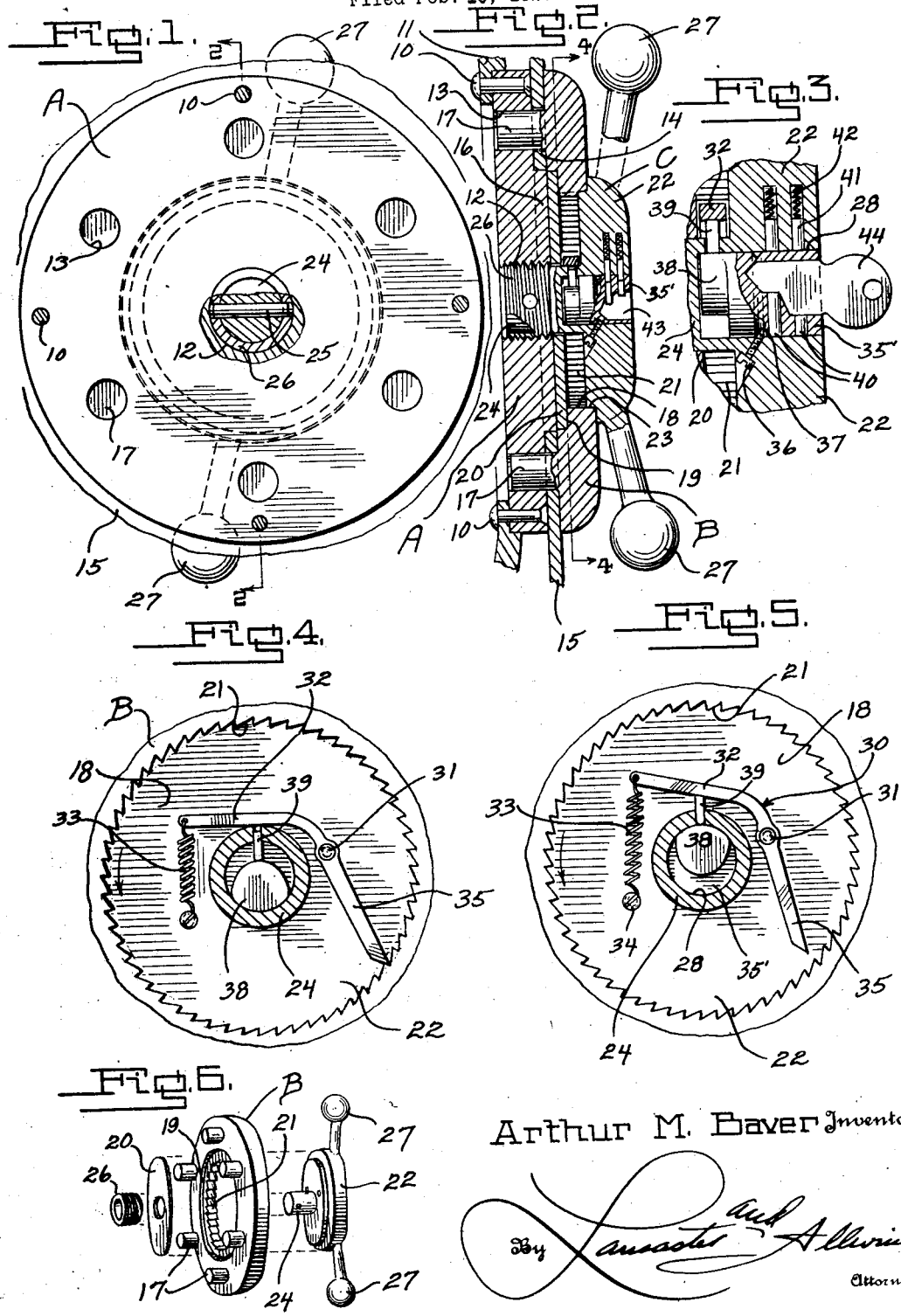

1,687,966

UNITED STATES PATENT OFFICE.

ARTHUR M. BAVER, OF DANUBE, MINNESOTA.

LOCKING CARRIER FOR DISK WHEELS.

Application filed February 19, 1927. Serial No. 169,559.

The present invention relates to improvements in holders or carriers for spare wheels of motor vehicles and the like, and the primary object of the invention is to provide a novel locking carrier for spare disk wheels whereby the spare wheel may be readily locked in a rigid position upon the carrier and against unauthorized removal.

A further object of the invention is to provide a locking carrier for disk wheels whereby the wheel may be locked in a position upon a carrier without the employing of bolts and nuts, and thus eliminating possibility of the wheel becoming lost due to loosening of the threaded fastening elements.

A further object of the invention resides in the provision of a device as set forth embodying a wheel and ratchet arrangement whereby the wheel is automatically locked in position upon the carrier upon rotation of a locking plate in one direction, and which locking plate is held against counter rotation by the pawl and ratchet arrangement until actuated by a key.

A further object of the invention resides in the provision of a locking carrier for disk wheels embodying novel and compact features of construction, and one which will operate efficiently for the quick and easy placing and removing of the disk wheels from their carriers.

Other objects and advantages of the invention will be apparent during the course of the following detailed description, taken in connection with the accompanying drawing forming a part of this specification and in which drawing:

Figure 1 is a plan view of the rear side of the locking carrier and showing fragmentary portions broken away for illustrating certain details of construction.

Figure 2 is a section on line 2—2 of Figure 1 and showing the manner of locking a disk wheel to the carrier.

Figure 3 is an enlarged fragmentary section illustrating the manner in which the cylinder lock is rotated for releasing of the locking pawl of the device.

Figure 4 is a fragmentary section taken substantially along the line 4—4 of Figure 2 and looking in the direction of the arrows, and showing the locking pawl in position for preventing counter rotation of the locking plate.

Figure 5 is a view substantially similar to that of Figure 4 but showing the locking pawl released for permitting rotation of the locking plate.

Figure 6 is a perspective view of certain portions of the device for illustrating the manner of assembly.

Referring to the drawing in detail, and wherein similar reference characters designate corresponding parts throughout the several views, the improved locking carrier is shown as embodying a carrier plate or block A, a retaining ring B slidably associated with the plate A, and a locking means C revolubly carried by the ring B and having threaded connection with the plate A.

The carrier plate or block A and which is preferably in the form of a disk, may be secured as by means of rivets or the like 10 to a suitable holder 11 which may be rigidly mounted at any desired location on the vehicle for the supporting of a spare disk wheel. The carrier plate is provided with an axial screw threaded bore 12 which preferably extends clear through the plate, and arranged in spaced relation concentric to the bore 12, in a suitable number of openings 13 which preferably correspond in number and align with the openings 14 provided in the wheel disk 15. These openings 14 in the wheel disk 15 receive the usual bolts whereby the wheels are detachably mounted upon their hub portions when mounting the wheels. Provided at the outer side of the plate A is an annular projection 16 which when the disk 15 is positioned at the outer side of the plate A, projects into the usual opening provided in the disk inwardly of the annular row of openings 14. As will be observed in Figure 2, the annular shoulder provided by the projection 16 is disposed inwardly of the annular row of openings 13 provided in the carrier plate A.

The retaining ring B and which serves for preventing rotation of the wheel disk 15 upon the plate projection 16, is preferably of a diameter equal to the diameter of the plate A, and projecting from the inner face of the ring is a series of pins or lugs 17 which preferably correspond in number to the number of openings 13. The ring B is intended to bear against the outer face of the wheel disk 15 with the pins 17 projecting through the disk openings 14 and into the aligning openings 13 provided in the carrier plate A. The inner end of the opening 18 through the ring B is provided with an annular rabbet 19 for receiving the peripheral portion of a retaining plate or disk 20, the rabbet 19 serving to allow the inner face of the disc 20 to be disposed flush with the inner surface of the ring B. The internal surface of the ring B is provided with a series of ratchet teeth 21, and which teeth as will be observed in Figure 2 are spaced inwardly from the outer surface of the ring and extend to the rabbet 19.

Referring now to the locking means C, the same includes a locking plate or cap 22 having an annular groove 23 provided with its inner peripheral edge for revolubly mounting the cap within the ring opening 18 at the outer face of the ring and in spaced relation to the retaining plate or disk 20. Projecting inwardly from the cap 22 is a hub shaft 24 which projects through the retaining plate 20, and mounted upon the inner end of the shaft 24 as by means of a suitable pin 25, is an externally threaded sleeve or collar 26 for threaded engagement within the threaded bore 12 of the carrier plate A upon rotation of the cap 22. The cap 22 may be provided with suitable handles 27 whereby the locking means may be readily rotated. The collar or sleeve 26 serves for retaining the ring B and locking means C in assembled relation when removed from the carrier plate A, and as will readily be observed, the locking means C is capable of free rotation with respect to the retaining ring B. Thus it will be seen that the ring B and locking means C are removed and replaced as a unit while removing or replacing of a disk wheel upon the carrier plate A. Opening at the outer side of the cap 22, and axially thereof, is a circular pocket 28, and which pocket as will be observed in Figures 2 and 3, projects inwardly past the cap for a short distance into the shaft 24. The locking means C further includes means for preventing counter rotation of the cap 22, and this means embodies an L-shaped pawl 30 which is pivotally mounted at its elbow upon a pivot pin 31 at the inner face of the cap 22. This pawl 30 and which is mounted in the pocket formed between the retaining plate 20 and cap 22, has its rocker arm 32 extending transversely across the shaft 24, and connected with the free end of the arm 32 is a spring 33 which acts for normally drawing the rocker arm into contact with the shaft 24. One end of the spring 33 is connected as at 34 to the cap 22, and as the spring acts to move the rocker arm 32 toward the shaft 24, the keeper or latch arm 35 of the pawl has its free end moved into gripping engagement with the internal row of ratchet teeth 21 of the retaining ring B. This pawl 30, when the device is in a locked position as illustrated in Figure 2, will allow rotation of the cap 22 in a clockwise direction but prevents counter rotation of the cap by reason of the keeper arm 35 engaging in the ratchet teeth 21 of the retaining ring B.

The locking means C further includes release means for the pawl 30, and in the example shown this release means is of the key operated type, and includes a plug 35′ which is revolubly mounted in the pocket 28 and retained against longitudinal movement by means of a retaining screw 36 having its end working in a circumferentially extending groove 37 provided in the plug 35′. This retaining screw 36 projects at an angle into the pocket 28 from the inner side of the cap 22 and thus prevents removal of the plug when the retaining ring B and locking means C are in assembled relation. Formed at the inner end of the plug 35′ is a cam 38 one surface of which preferably conforms to the inner surface of the pocket 28. Projecting through the shaft 24 at the inner end of the pocket 28, is a lift pin 39 the outer end of which engages the rocker arm 32 of the pawl 30 when the pin is extended by means of the cam 38. In Figures 4 and 5 it will be seen the manner in which the cam 38 acts, upon rotation of the plug 35′ to move the pin 39 outwardly into engagement with the rocker arm 32 for swinging of the pawl 30. Carried by the plug 35′, is a series of pin tumblers 40 each having a complementary driver pin 41 slidably mounted in chambers provided in the cap 22, and behind each driver 41 is a spring 42 serving to normally urge the drivers toward the plug 35′. The plug 35′ is also provided with a keyway 43 into which a key 44 may be inserted, and as the key passes under the pins 40, the pins are successively lifted to a point whereby the joints between each pin and its driver align with the joint between the plug 35′ and the cap 22, and in which position the plug is free to be rotated by the key 44. As the plug 35′ is revolved by means of the key 44, the cam 38 acts upon the lift pin 39 for forcing the pin outwardly through the shaft 24 into engagement with the rocker arm 32. In Figures 2 and 4, and wherein the device is shown in a locked position, the plug 35′ is shown locked against rotation by means of the drivers 41, and in which position the lift pin 39 is free to move inwardly for allowing the spring 33 to move the keeper arm 35 into engagement with the ratchet teeth 21 for preventing counter or retrograde rotation of the cap 22. In Figures 3 and 5, and wherein the device is shown in an unlocked position, it will be seen that the cam 38 has moved to a position for extending the lift pin 39 and swinging of the pawl 30 so that the keeper arm 35 is disengaged from the ratchet teeth 21 and allowing ready rotation of the cap 22 in either direction with respect to the retaining ring B.

In positioning a wheel upon the carrier, the disk 15 is first positioned over the projection 16 and revolved until the disk openings 14 align with the openings 13 of the carrier plate A. The retaining ring pins 17 are then positioned at the openings 14 and in which position the hub shaft 24 will be in alignment with the threaded bore 12, and upon rotation of the cap 22 by means of the handles 27, the retaining ring B will be moved inwardly for causing the pins 17 to project into the carrier plate openings 13. The pawl 30 will readily ride past the ratchet teeth 21 during rotation of the cap 22 in a clockwise direction, and when the ring B has been moved into tight engagement with the wheel disk B, the pawl 30 prevents counter rotation of the cap 22 and thus retains the wheel in a locked position upon the carrier until the key 44 is inserted into the plug 35' for rotation of the plug and consequent freeing of the pawl keeper arm 35. It will be seen that the retaining ring pins 17 are forcibly moved into and out of the aligning openings 13 and 14 by means of the threaded sleeve 26 being in threaded engagement with the carrier plate A.

From the foregoing description it will be apparent that a novel and practical type of locking carrier has been provided embodying features whereby spare disk wheels of motor vehicles may be readily and quickly locked in a rigid position and against unauthorized removal, and one wherein the retaining means for the lock is disposed in a fully concealed and protected position against possible tampering therewith and against liability of foreign matter interfering with the proper operation thereof.

Changes in detail may be made to the specific form of the invention herein shown and described, without departing from the spirit of the invention or the scope of the following claims.

I claim:

1. A device of the class described comprising a fixed carrier plate, a retaining ring slidably interfitting with the carrier plate for clamping a wheel disk between the plate and ring, and a locking means revolubly carried by the retaining ring and having threaded connection with the carrier plate.

2. A device of the class described comprising a fixed carrier plate, a retaining ring slidably interfitting with the carrier plate for clamping a wheel disk between the plate and ring, and a locking means revolubly carried by the retaining ring and having threaded connection with the carrier plate, said locking means being automatically locked with the retaining ring upon rotation into operative connection with the carrier plate.

3. A device of the class described comprising a fixed carrier plate having openings provided therein for aligning with the openings in a wheel disk, a retaining ring having pins projecting from one side thereof for slidably fitting in said openings for clamping a wheel disk between the plate and ring, and a locking means revolubly carried by the retaining ring and having threaded connection with the carrier plate for movement of said pins into the openings in the carrier plate.

4. A device of the class described comprising a fixed carrier plate having a screw threaded bore and a series of openings arranged concentric with the bore, a retaining ring for clamping a wheel disk between the plates and ring and including a series of annularly arranged pins for fitting in the openings in the carrier plate, and a locking means carried by the retaining ring, including a revoluble cap having a threaded hub portion for threaded engagement within said bore of the carrier plate, and a spring pressed pawl engageable with the retaining ring for preventing counter rotation of the cap.

5. A locking carrier for disk wheels, comprising a carrier plate provided with a threaded bore, a retaining ring slidably interfitting with the carrier plate for clamping the wheel disk between the plate and ring, and a locking means including a cap revolubly carried by the retaining ring and having a threaded hub portion for threaded engagement within the bore of the carrier plate, a pawl pivotally carried by the cap and engageable with the retaining ring for preventing rotation of the cap in one direction, and a key operated release means carried by the cap for releasing said pawl and permitting counter rotation of the locking means.

6. A locking carrier for disk wheels comprising a fixed carrier plate having a threaded bore, a retaining ring slidably interfitting with the carrier plate for clamping the wheel disk between the plate and ring, a cap revolubly mounted at the outer face of the retaining ring and having a threaded hub portion for threaded engagement with the bore of the carrier plate, a spring pressed pawl pivotally carried by the cap and engageable with the retaining ring for preventing counter rotation of the cap, a plug rotatably mounted in the cap for releasing said pawl and allowing counter rotation of the cap, and key operated release means for the plug.

7. A locking carrier for disk wheels comprising a fixed carrier plate provided with a screw threaded bore, a retaining ring slidably interfitting with the carrier plate for clamping a wheel disk between the plate and ring, a cap revolubly mounted at the outer face of the retaining ring and having a threaded hub portion extending through the ring for threaded engagement in the bore of the carrier plate, said cap having a pocket opening at the outer side thereof, a spring actuated pawl pivotally carried by the inner side of the cap and engageable with the retaining ring for permitting rotation of the cap in but one direction, a plug rotatably mounted in said pocket and including a cam portion acting to release said pawl and allowing for counter rotation of the cap, and key operated release means for the plug for permitting rotation of the plug.

8. A locking carrier for disk wheels comprising a fixed carrier plate provided with a threaded bore, a retaining ring slidably interfitting with the carrier plate for clamping the wheel disk between the plate and ring, a cap revolubly mounted at the outer side of the retaining ring and having a hub portion provided with threads engageable in the bore of the carrier plate, said cap having a circular pocket opening at the outer face thereof, a spring actuated pawl pivotally carried by the inner side of the cap and having engagement with the retaining ring for permitting rotation of the cap in but one direction, a lift pin slidably mounted in the hub portion with one end of the pin projecting into said pocket and its outer end adapted for engagement with said pawl, a plug revolubly mounted in said pocket and having a cam portion for acting upon said lift pin, and a key operated release means for the plug for allowing rotation of the plug and subsequent freeing of said pawl for allowing counter rotation of the cap.

9. A locking carrier for disk wheels comprising a fixed carrier plate provided with a threaded bore, a retaining ring slidably interfitting with the carrier plate for clamping the wheel disk between the plate and ring and having an annular series of ratchet teeth provided at the internal diameter of the ring, a cap revolubly mounted at the outer face of the retaining ring and having a hub portion for threaded engagement in the bore of the carrier plate, a pawl pivotally mounted at the inner face of the cap and normally urged into engagement with the ratchet teeth for preventing rotation of the cap in but one direction, a plug revolubly mounted in the cap and including a cam portion operating to release said pawl upon rotation of the plug, and key operated release means for permitting rotation of said plug.

10. A locking carrier for disk wheels comprising a fixed carrier plate having a threaded bore and a series of annularly arranged openings, a retaining ring for clamping the wheel disk between the plate and ring, said ring being provided with a series of pins for fitting in the openings of the carrier plates and having ratchet teeth provided on the internal surface of the ring, a retaining plate mounted at the inner side of the retaining ring and extending across the opening through the ring, a cap revolubly mounted in the ring opening at the outer surface of the ring and including a hub portion extending through said retaining plate, a threaded sleeve carried by the hub portion inwardly of the retaining plate for threaded engagement in the bore of the carrier plate upon rotation of said cap, a pawl pivotally carried by the cap between the cap and retaining plate and normally urged into engagement with the ratchet teeth of the retaining ring, and a key operated release means for the pawl revolubly mounted in said cap.

ARTHUR M. BAVER.